United States Patent
Monea et al.

(10) Patent No.: US 12,461,742 B2
(45) Date of Patent: Nov. 4, 2025

(54) SECURE CODE CLUSTERING THROUGH LLM-BASED SEMANTIC ANALYSIS

(71) Applicant: CrowdStrike, Inc., Sunnyvale, CA (US)

(72) Inventors: Damian Monea, Slatina (RO); Paul Sumedrea, Bucharest (RO); Mihaela-Petruta Gaman, Bucharest (RO); Alexandru Dinu, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 200 days.

(21) Appl. No.: 18/496,722

(22) Filed: Oct. 27, 2023

(65) Prior Publication Data
US 2025/0138819 A1    May 1, 2025

(51) Int. Cl.
| | |
|---|---|
| *G06F 9/50* | (2006.01) |
| *G06F 8/40* | (2018.01) |
| *G06F 8/75* | (2018.01) |
| *G06F 9/445* | (2018.01) |
| *G06F 9/455* | (2018.01) |
| *G06F 16/2457* | (2019.01) |
| *G06F 21/56* | (2013.01) |
| *G06F 40/30* | (2020.01) |
| *G06N 20/00* | (2019.01) |

(52) U.S. Cl.
CPC ............ *G06F 8/75* (2013.01); *G06F 21/563* (2013.01); *G06F 40/30* (2020.01)

(58) Field of Classification Search
CPC .......... G06F 8/75; G06F 40/30; G06F 21/563; G06F 18/214; G06F 18/2411; G06F 18/213; G06F 18/241; G06F 8/70; G06F 8/4435; G06F 18/2155; G06F 18/217; G06N 3/045; G06N 3/084; G06N 20/10; G06N 20/00

See application file for complete search history.

(56) References Cited

U.S. PATENT DOCUMENTS

| | | | |
|---|---|---|---|
| 11,615,184 B2* | 3/2023 | Kutt | G06N 20/00 726/23 |
| 11,947,940 B2* | 4/2024 | Suneja | G06F 8/4435 |

OTHER PUBLICATIONS

Monigatti, Leonie, "10 Exciting Project Ideas Using Large Language Models (LLMs) for Your Portfolio", Towards Data Science, downloaded from https://towardsdatascience.com/10-exciting-project-ideas-using-large-language-models-llms-for-your-portfolio-970b7ab4cf9e#a673, May 15, 2023, 30 pp total.

Tyagi, Aayush, "10 Exciting Projects on Large Language Models (LLM)", downloaded from https://www.analyticsvidhya.com/blog/2023/05/projects-on-llm/#h-clustering-and-classifi, updated on Jun. 27, 2023, 8 pp total.

* cited by examiner

*Primary Examiner* — Thuy Dao
(74) *Attorney, Agent, or Firm* — Womble Bond Dickinson (US) LLP

(57) ABSTRACT

An approach is provided that provides a plurality of source code samples to an artificial intelligence model (AIM) trained to describe source code based on performing semantic analysis on the source code. The approach produces, using the AIM, a plurality of semantic descriptions that describe the plurality of source code samples. Then, the approach converts the plurality of semantic descriptions into a plurality of semantic embeddings. In turn, the approach creates a plurality of clusters from the plurality of semantic embeddings, wherein each one of the plurality of clusters corresponds to two or more of the plurality of source code samples.

20 Claims, 6 Drawing Sheets

SECURE CODE CLUSTERING THROUGH LLM-BASED SEMANTIC ANALYSIS

TECHNICAL FIELD

Aspects of the present disclosure relate to cybersecurity threat prevention, and more particularly, to secure code clustering through large language model (LLM)-based semantic analysis.

BACKGROUND

Cybersecurity refers to the practice of protecting computer systems, networks, and digital assets from theft, damage, unauthorized access, and various forms of cyber threats. Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware. Additionally, cybersecurity threats encompass suspicious activities, such as unusual patterns of network traffic or unauthorized access attempts, which may indicate potential security breaches or weaknesses that require investigation and mitigation.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
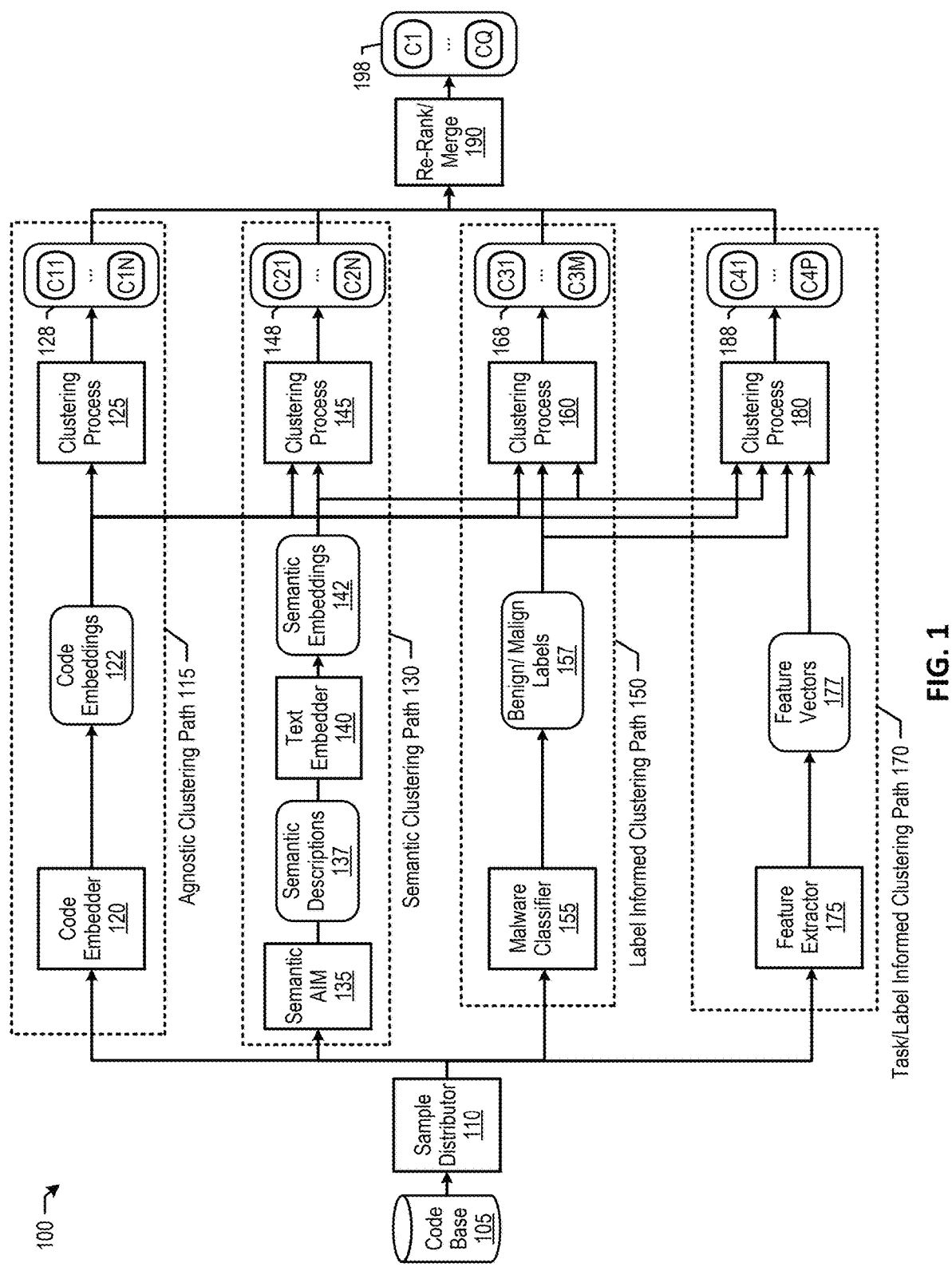
FIG. 1 is a block diagram that illustrates an example system for clustering source code using multiple clustering path types that include a semantic clustering path, in accordance with some embodiments of the present disclosure.

The field of cybersecurity faces a challenge of analyzing vast datasets derived from various sources, including customer data and automated attack techniques. Attackers have become increasingly productive, employing tools that automate their malicious activities. Cybersecurity companies provide security solutions to other organizations that are heavily automating repetitive work through computer programs (e.g., scripts). An organization's automation suites run regularly and frequently throughout the day, generating a multitude of slightly different variations of the same source code. These variations may arise from factors such as time stamps, compiler-specific options (e.g., debug info, build comments, etc.), and other similar factors.

A challenge found with the generation of different variations of source code is that they may trigger a significant volume of false alarms, known as false positives (FPs), even though they originate from the same source code. This influx of false alarms can lead to customer dissatisfaction and an increase in complaints. Threat analysts/customer support teams may review the false positives in an attempt to provide explanations and mitigate the occurrence of future false positives. However, manually sifting through vast quantities of data is an impractical and labor-intensive endeavor.

Clustering techniques have been employed to group together similar data for review in cybersecurity contexts. Unfortunately, when dealing with source code and text-based data, existing tools and methodologies have demonstrated shortcomings. Clustering techniques relying on syntax-based analysis, or event feature vector-based approaches, have yielded imperfect results because they struggle to accurately group together code segments that exhibit different syntax but perform the same functionality.

Artificial intelligence (AI) is a field of computer science that encompasses the development of systems capable of performing tasks that typically require human intelligence. Machine learning is a branch of artificial intelligence focused on developing algorithms and models that allow computers to learn from data and make predictions or decisions without being explicitly programmed. Machine learning models are the foundational building blocks of machine learning, representing the mathematical and computational frameworks used to extract patterns and insights from data. Large language models, a specialized category within machine learning models, are trained on vast amounts of text data to capture the nuances of language and context. By combining advanced machine learning techniques with enormous datasets, large language models harness data-driven approaches to achieve highly sophisticated language understanding and generation capabilities. As discussed herein, artificial intelligence models, or AI models, include machine learning models, large language models, and other types of models that are based on neural networks, genetic algorithms, expert systems, Bayesian networks, reinforcement learning, decision trees, or a combination thereof.

The present disclosure addresses the above-noted and other deficiencies by providing an approach of using multiple clustering paths, which includes a semantic clustering path, to cluster source code samples and reduce resource requirements to perform threat analysis. The approach provides a plurality of source code samples to an artificial intelligence model (AIM) that is trained to perform semantic analysis on the source code. The approach produces, using the AIM, a plurality of semantic descriptions that describe the plurality of source code samples, and converts the plurality of semantic descriptions into a plurality of semantic embeddings. In turn, the approach creates a plurality of clusters from the plurality of semantic embeddings, wherein each one of the plurality of clusters corresponds to at least one source code sample. Clusters containing a single sample are generally referred to as 'noisy' because the sample is far (with respect to a distance metric) from other samples in the dataset. In some embodiments, each one of the plurality of semantic descriptions describe a functionality of a corresponding one of the plurality of source code samples.

In some embodiments, the approach provides the plurality of source code samples to a plurality of clustering paths. The approach produces, by each of the plurality of clustering paths, a plurality of different clusters based on a cluster type of their corresponding clustering path. The approach merges the plurality of different clusters to produce a plurality of final clusters. In some embodiments, the plurality of clustering paths comprise a semantic clustering path, an agnostic clustering path, a label informed clustering path, and a task plus label informed clustering path.

In some embodiments, the approach generates a plurality of cluster plots from the plurality of clusters. The approach identifies a discrepant cluster plot from the plurality of cluster plots, and then identifies a first one of the plurality of clustering paths that corresponds to the discrepant cluster plot and adjusts the first clustering path accordingly. A discrepant cluster plot is a graphical representation of data clusters that shows noticeable inconsistencies or disagreements between the cluster assignments produced by different clustering algorithms or representations. A discrepant cluster plot suggests that there are conflicting patterns or interpretations in the data, warranting further investigation or refinement of the clustering approach.

In some embodiments, the plurality of final clusters comprise a first final cluster. The approach identifies a group of source code samples from the plurality of source code samples that correspond to the first final cluster. The approach evaluates a subset of the group of source code samples to determine whether the group of source code samples indicate a cybersecurity threat. In turn, the approach quarantines the group of source code samples in response to determining that the subset of source code samples indicate the cybersecurity threat.

In some embodiments, the approach trains the AIM by providing training source code, training source code descriptions, and one or more cybersecurity threat indicators to the AIM, wherein the one or more cybersecurity threat indicators identify one or more cybersecurity threats in the training source code.

As discussed herein, the present disclosure provides an approach that improves the operation of a computer system by identifying discrepant cluster plots and adjusts (e.g., recalibrate, retrain, etc.) their corresponding clustering paths accordingly. In addition, the present disclosure provides an improvement to the technological field of cybersecurity prevention by clustering code samples based on semantic analysis to enhance the accuracy and efficiency of cybersecurity analysis.

FIG. 1 is a block diagram that illustrates an example system for clustering source code using multiple clustering path types that include a semantic clustering path, in accordance with some embodiments of the present disclosure.

System 100 uses a hybrid clustering technique that accounts for the syntax and semantics of source code samples to provide a more accurate clustering of diverse code variations. By combining syntax and semantic analysis with label and task information, system 100 offers an improved solution for cybersecurity companies to efficiently manage and reduce false alarms generated during the analysis of customer-provided source code, enhancing the overall effectiveness and reliability of cybersecurity solutions.

System 100 includes source code samples stored in code base 105. The source code samples may be historical source code samples, near-real time source code samples, or a combination thereof. System 100 uses sample distributor 110 to distribute the source code samples to agnostic clustering path 115, semantic clustering path 130, label informed clustering path 150, and task/label informed clustering path 170. In some embodiments, sample distributor 110 distributes source code samples to each of the clustering paths. In some embodiments, sample distributor 110 distributes source code samples to one or more of the clustering paths, for example, to reduce processing resources, to troubleshoot a particular clustering path, etc.

Agnostic clustering path 115 receives source code samples and uses code embedder 120 to obtain code embeddings 122 from source code samples. In some embodiments, code embedder 120 may be an independent AIM, unrelated to malware classification, to represent a baseline through which system 100 clusters source code samples based on their general structure. Code embeddings feed into clustering process 125 to produce clusters 128.

Semantic clustering path 130 provides a "descriptive clustering" approach that uses semantic AIM 135 to obtain semantic descriptions 137 from raw text included in the source code samples. Semantic AIM 135 performs semantic analysis on the source code samples to understand the context and meaning behind semantic elements (e.g., keywords, expressions, statements, etc.) in the source code samples. The semantic analysis process involves semantic AIM 135 extracting and interpreting implicit meanings, concepts, sentiments, or emotions from the text. Through training on vast amounts of text data, semantic AIM 135 learned to identify patterns and connections among words and phrases, allowing semantic AIM 135 to accurately predict word or sentence meanings (see FIG. 2 and corresponding text for further details).

Semantic descriptions 137 feed into text embedder 140. Text embedder 140 transforms the text in semantic descriptions 137 into semantic embeddings 142 (e.g., numerical vectors). This dimensional reduction technique helps to capture semantic similarities between words and phrases to quantify and group similar items together. Clustering process 145 receives semantic embeddings 142 and code embeddings 122 to produce clusters 148. In some embodiments, clusters 148 may be different than clusters 128 because clustering process 145 uses both code embeddings 122 and semantic embeddings 142 to generate clusters 148.

Label informed clustering path 150 includes malware classifier 155, which classifies the source code samples to produce benign/malign labels 157 (e.g., no cybersecurity threat detected/cybersecurity threat detected). Clustering process 160 receives benign/malign labels 157, code embeddings 122, and semantic embeddings 142 to produce clusters 168. In some embodiments, clustering process 160 evaluates the three different inputs and determines whether one of the clustering paths is discrepant. For example, code embeddings 122 may produce a cluster plot similar to a cluster plot produced by semantic embeddings 142. However benign/malign labels 157 may form a discrepant cluster plot (e.g., not correlated with the other two cluster plots). In this example, clustering process 160 may weigh the clusters produced by benign/malign labels 157 less than the clusters produced by code embeddings 122 and semantic embeddings 142 to produce clusters 168. In some embodiments, clustering process 160 may generate an error message to indicate that label informed clustering path 150 requires attention.

Task/label informed clustering path 170 includes feature extractor 175. Feature extractor 175 processes the source code samples to generate feature vectors 177 based on source code sample characteristics such as script length, external dependencies, and n-gram statistics. Task/label informed clustering path 170 enhances clustering by considering objective features in feature vectors 177. Clustering process 180 receives feature vectors 177, code embeddings 122, semantic embeddings 142, and benign/malign labels 157 to produce clusters 188. In some embodiments, clustering process 180 evaluates the four different inputs and determines whether one of the clustering paths is discrepant as discussed above.

Re-rank/merge 190 receives and evaluates clusters 128, 148, 168, and 188 to produce a final set of clusters 198. In some embodiments, re-rank/merge 190 identifies the most accurate clusters (e.g., most correlated) and removes clusters that may be less informative (e.g., discrepant). The final set of clusters 198 may then be used for analyzing a subset of the full set of source code samples. For example, cluster C1 in clustering results 198 may include data points corresponding to 1,000 source code samples that are similar in nature, such as each relating to the same source code but having different variations. A subset of these clusters are evaluated, such as 100 source code samples, to determine whether the corresponding 1,000 source code samples indicate a cybersecurity threat.

Figure 2:
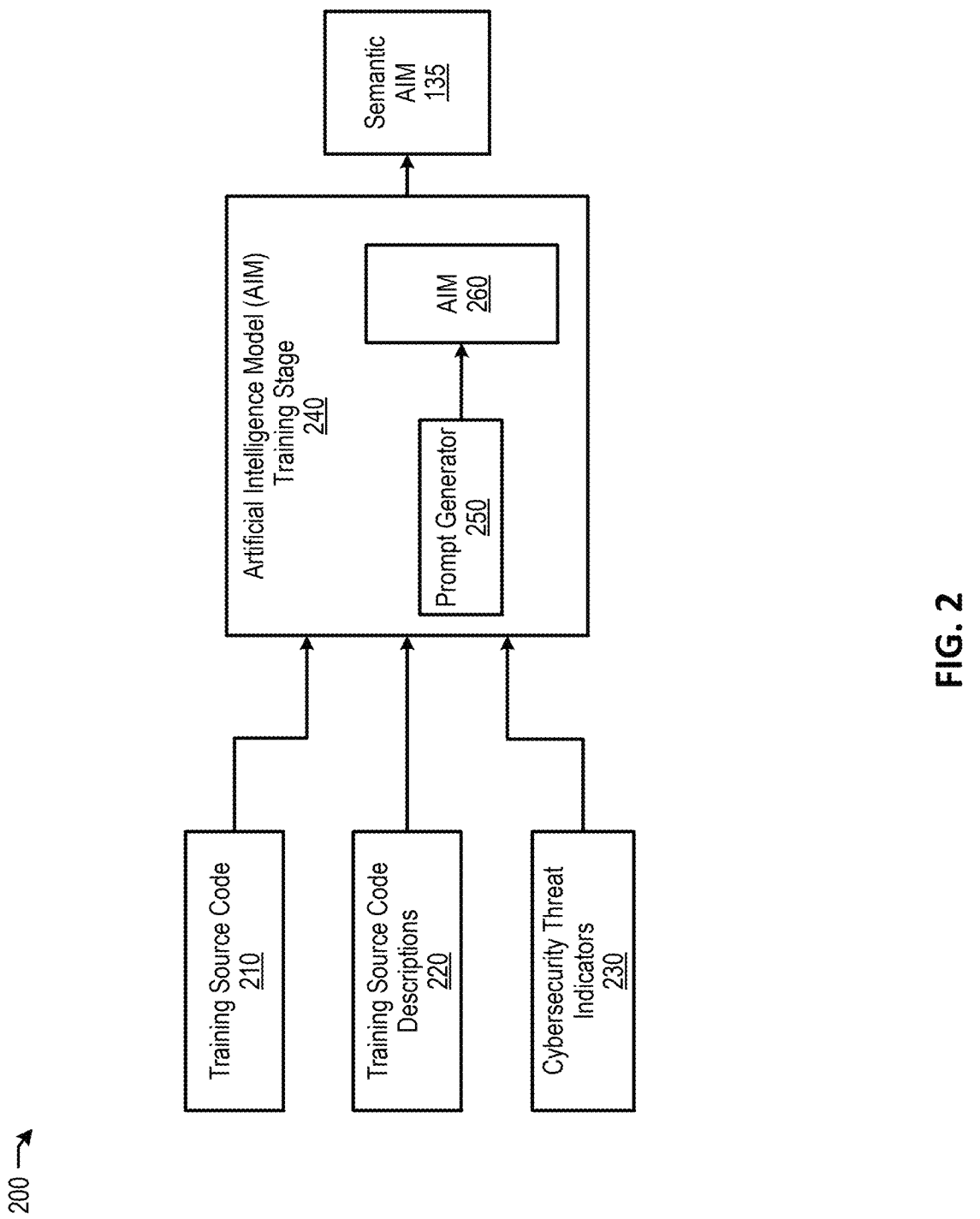
FIG. 2 is a block diagram that illustrates an example system for training an artificial intelligence model (AIM) to perform semantic analysis on source code and produce descriptions of the source code, in accordance with some embodiments of the present disclosure.

FIG. 2 is a block diagram that illustrates an example system for training an AIM to perform semantic analysis on source code and produce descriptions of the source code, in accordance with some embodiments of the present disclosure.

AIM training stage 240 trains AIM 260 to produce semantic AIM 135. In some embodiments, AIM 260 may be considered a general model, or foundation model, which has a context around various source code semantics. In some embodiments, AIM 260 and AIM 135 are large language models that are trained on vast amounts of text data to capture the semantic nuances of language and context (e.g., the vast amounts of text data assist the large language models in identifying the subtle differences in meaning associated with words).

Prompt generator 250 includes information from training source code 210, training source code descriptions 220, and cybersecurity threat indicators 230 to generate prompts to feed into AIM 260. Training source code 210 includes instructions and examples of code-related tasks. Training source code descriptions 220 offer contextual information about training source code 210, including its purpose, expected inputs, and desired outputs. Training source code descriptions 220 also aid AIM 260 in understanding the semantics and intent behind training source code 210. Cybersecurity threat indicators 230 enhance AIM 260's understanding and ability to address security-related tasks. By including cybersecurity threat indicators 230 in prompts, AIM 260 learns to recognize and analyze potential security threats in future source code samples, aiding in the identification of false positives, cyberattacks or a combination thereof.

In some embodiments, AIM training stage 240 performs self-supervised training on AIM 260 before the training depicted in FIG. 2 is started. Self-supervised training is a technique where an AIM learns from vast amounts of unlabeled data. Through tasks such as language modeling or masked language prediction, AIM 260 predicts missing words in sentences, effectively learning grammar, semantics, and contextual relationships. This self-supervised learning approach creates a foundation for AIM 260's understanding of language, enabling semantic AIM 135 to perform a range of tasks such as text generation, translation, and summarization.

Prompt generator 250 inputs prompts into AIM 260 using, for example, the above information to iteratively train AIM 260. AIM training stage 240 produces semantic AIM 135, which is trained to perform semantic analysis on source code samples and produce semantic descriptions in semantic clustering path 130.

Figure 3A:
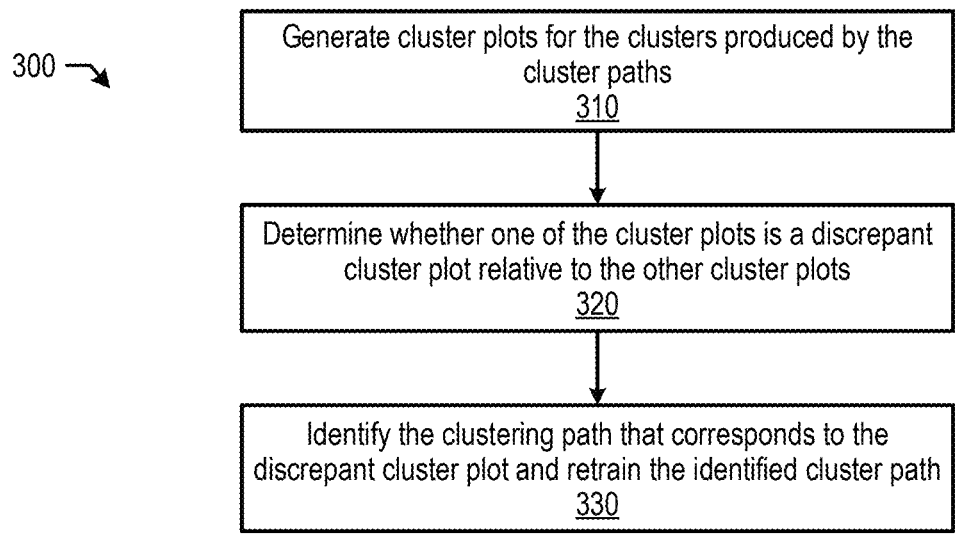
FIG. 3A is a flow diagram of a method that identifies discrepant cluster plots and adjusts their corresponding clustering path, in accordance with some embodiments of the present disclosure.

FIG. 3A is a flow diagram of a method that identifies discrepant cluster plots and adjusts their corresponding clustering path, in accordance with some embodiments of the present disclosure. Method 300 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by cluster process 125, cluster process 145, cluster process 160, cluster process 180, re-rank/merge 190, processing device 510 (shown in FIG. 5), processing device 602 (shown in FIG. 6), or a combination thereof.

With reference to FIG. 3A, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

With reference to FIG. 3A, method 300 begins at block 310, where processing logic generates cluster plots for clustering results 128, 148, 168, and 188 produced by clustering paths 115, 130, 150, and 170. In some embodiments, the corresponding clustering processes 125, 145, 160, and 180 generate the cluster plots. In some embodiments, re-rank/merge 190 generates the cluster plots from the clusters.

At block 320, processing logic determines whether one of the cluster plots is a discrepant cluster plot relative to the other cluster plots. A discrepant cluster plot is a graphical representation of data clusters that shows noticeable inconsistencies or disagreements between the cluster assignments produced by different clustering algorithms or representations.

At block 330, processing logic identifies the clustering path that corresponds to the discrepant cluster plot and adjusts the identified clustering path based on the corresponding clustering path. For example, processing logic may determine that agnostic clustering path 115 is discrepant and retrain code embedder 120 with updated information. In another example, processing logic may determine that semantic clustering path 130 corresponds to a discrepant clustering retrain semantic AIM 135, text embedder 140, or a combination thereof to calibrate clustering path 130 accordingly.

Figure 3B:
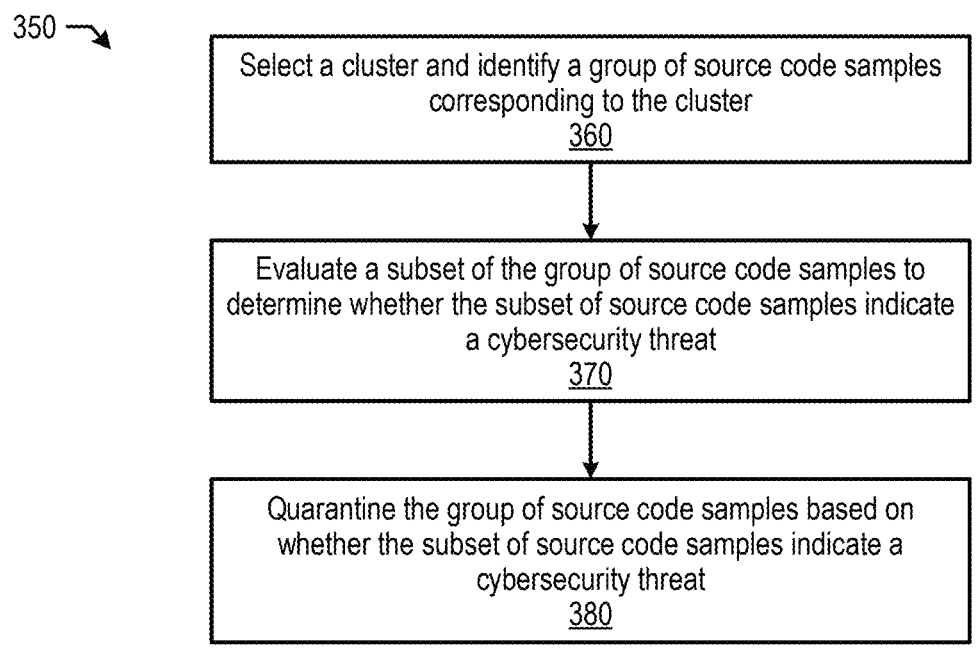
FIG. 3B is a flow diagram of a method for processing source code samples in the context of cybersecurity use-cases based on clusters, in accordance with some embodiments of the present disclosure.

FIG. 3B is a flow diagram of a method for processing source code samples in the context of cybersecurity use-cases based on clusters, in accordance with some embodiments of the present disclosure. Method 350 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by cluster process 125, cluster process 145, cluster process 160, cluster process 180, re-rank/merge 190, processing device 510 (shown in FIG. 5), processing device 602 (shown in FIG. 6), or a combination thereof.

With reference to FIG. 3B, method 350 illustrates example functions used by various embodiments. Although specific function blocks ("blocks") are disclosed in method 350, such blocks are examples. That is, embodiments are well suited to performing various other blocks or variations of the blocks recited in method 350. It is appreciated that the blocks in method 350 may be performed in an order different than presented, and that not all of the blocks in method 350 may be performed.

With reference to FIG. 3B, method 350 begins at block 360, where processing logic selects a cluster and identifies a group of source code samples that correspond to the cluster. For example, a cluster may correspond to 1,000 source code samples. At block 370, processing logic evaluates a subset of the group of source code samples to determine whether the subset of source code samples indicate a cybersecurity threat. For example, processing logic may evaluate 100 out of the 1,000 source code samples to determine whether the 100 samples indicate a cybersecurity threat.

At block 380, processing logic quarantines the group of source code samples when the subset of source code samples indicate a cybersecurity threat. Using the example above, processing logic quarantines the 1,000 source code samples corresponding to the selected cluster. In some embodiments, the 900/1,000 source code samples corresponding to the selected cluster may also be tagged based on the other 100/1,000 source code samples in the cluster. These tags may be used for other downstream purposes, such as malware classification, threat actor attribution, technique and tactic classification, etc.

Figure 4:
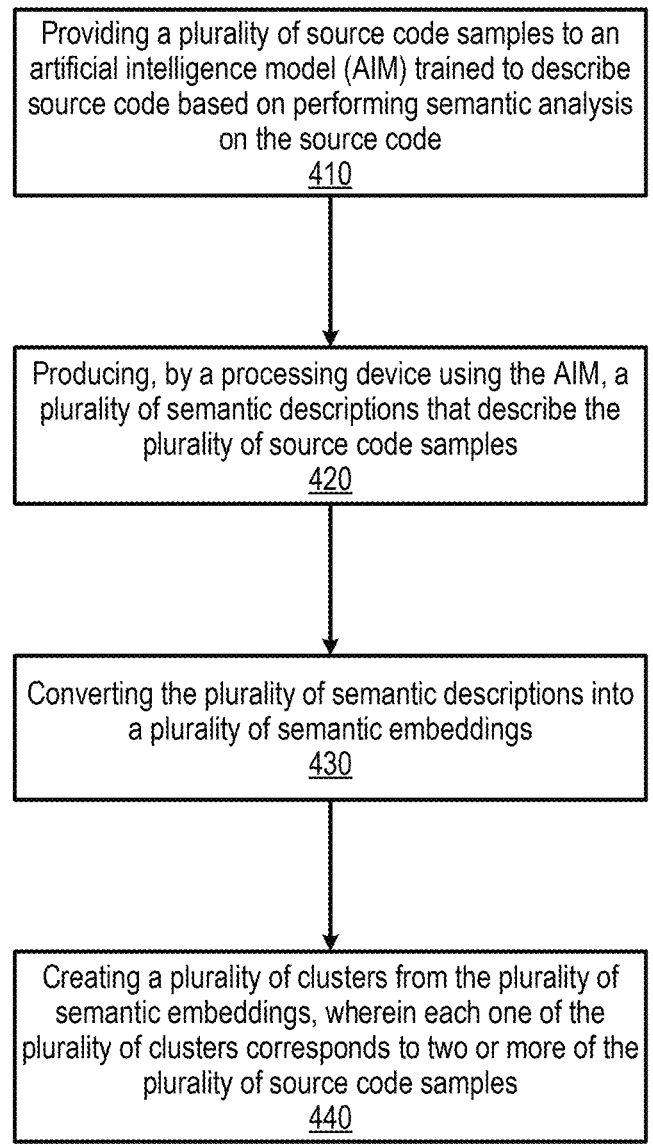
FIG. 4 is a flow diagram of a method for using a semantic AIM to cluster source code samples based on their semantic descriptions, in accordance with some embodiments of the present disclosure.

FIG. 4 is a flow diagram of a method for using a semantic AIM to cluster source code samples based on their semantic descriptions, in accordance with some embodiments of the present disclosure.

Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed sample distributor 110, semantic AIM 135, text embedder 140, clustering process 145, processing device 510 (shown in FIG. 5), processing device 602 (shown in FIG. 6), or a combination thereof.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference to FIG. 4, method 400 begins at block 410, where processing logic provides a plurality of source code samples to an artificial intelligence model (AIM) trained to describe source code based on performing semantic analysis on the source code. In some embodiments, processing logic trains the AIM by providing training source code, training source code descriptions, and one or more cybersecurity threat indicators to the AIM, wherein the one or more cybersecurity threat indicators identify one or more cybersecurity threats in the training source code.

At block 420, processing logic produces, using the AIM, a plurality of semantic descriptions that describe the plurality of source code samples. In some embodiments, each one of the plurality of semantic descriptions describe a functionality of a corresponding one of the plurality of source code samples.

At block 430, processing logic converts the plurality of semantic descriptions into a plurality of semantic embeddings. In some embodiments, processing logic uses a text embedder, such as text embedder 140 shown in FIG. 1, to convert text in semantic descriptions 137 to numerical representations (e.g., semantic embeddings).

At block 440, processing logic creates a plurality of clusters from the plurality of semantic embeddings, wherein each one of the plurality of clusters corresponds to two or more of the plurality of source code samples. In some embodiments, processing logic generates a plurality of cluster plots from the plurality of clusters and the plurality of different clusters. Processing logic identifies a discrepant cluster plot relative to the other cluster plots. Processing logic then identifies a first one of the plurality of clustering paths that corresponds to the first cluster plot. Processing logic adjusts the first clustering path accordingly, such as by retraining an AIM, recalibrating a code embedder, classifier, extractor, etc.

Figure 5:
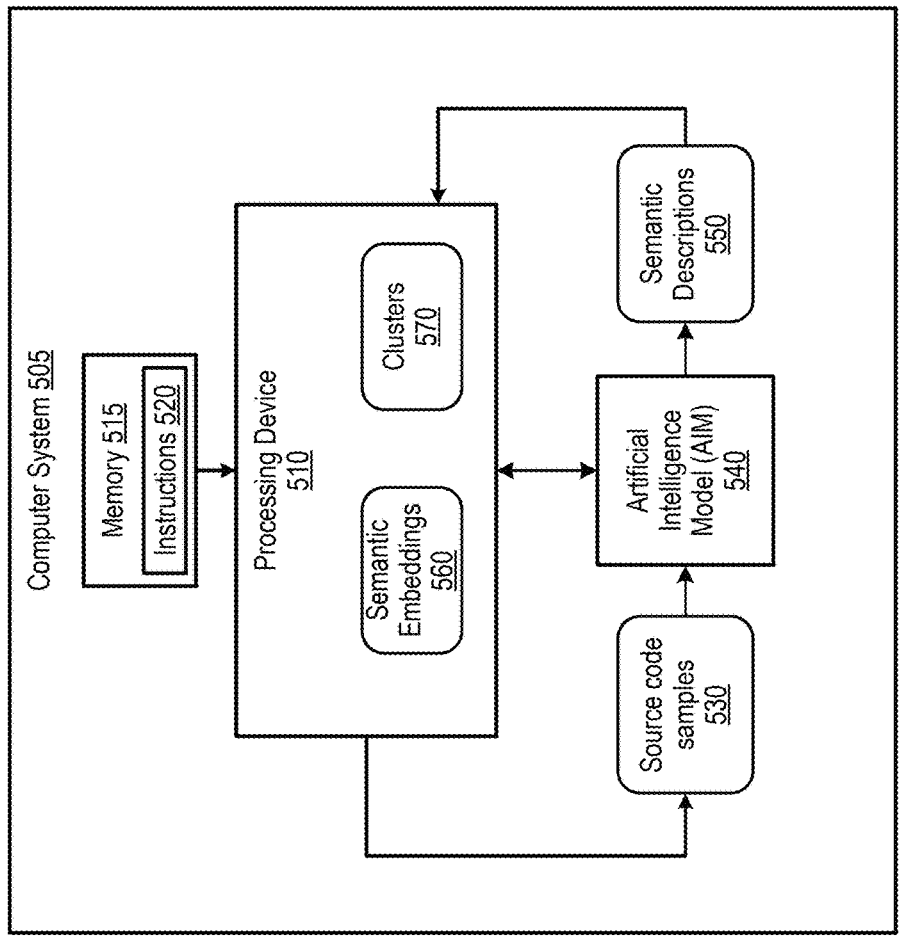
FIG. 5 is a block diagram that illustrates an example system for using a semantic AIM to cluster source code samples based on their semantic descriptions, in accordance with some embodiments of the present disclosure.

FIG. 5 is a block diagram that illustrates an example system for using a semantic AIM to cluster source code samples based on their semantic descriptions, in accordance with some embodiments of the present disclosure.

Computer system 500 includes processing device 510 and memory 515. Memory 515 stores instructions 520 that are executed by processing device 510. Instructions 520, when executed by processing device 510, cause processing device 510 to provide source code samples 530 to artificial intelligence model (AIM) 540, which is trained to describe source code samples 530 based on performing semantic analysis on source code samples 530. In some embodiments, AIM 540 is a large language model that is trained on vast amounts of text data to capture the semantic nuances of language and context (e.g., the vast amounts of text data assist the large language model in identifying the subtle differences in meaning associated with words).

Processing device 510 uses AIM 540 to produce semantic descriptions 550 that describe source code samples 530, and converts semantic descriptions 550 into semantic embeddings 560. In turn, processing device 510 creates clusters 570 from semantic embeddings 560, where each one of the clusters 570 corresponds to two or more of source code samples 530.

Figure 6:
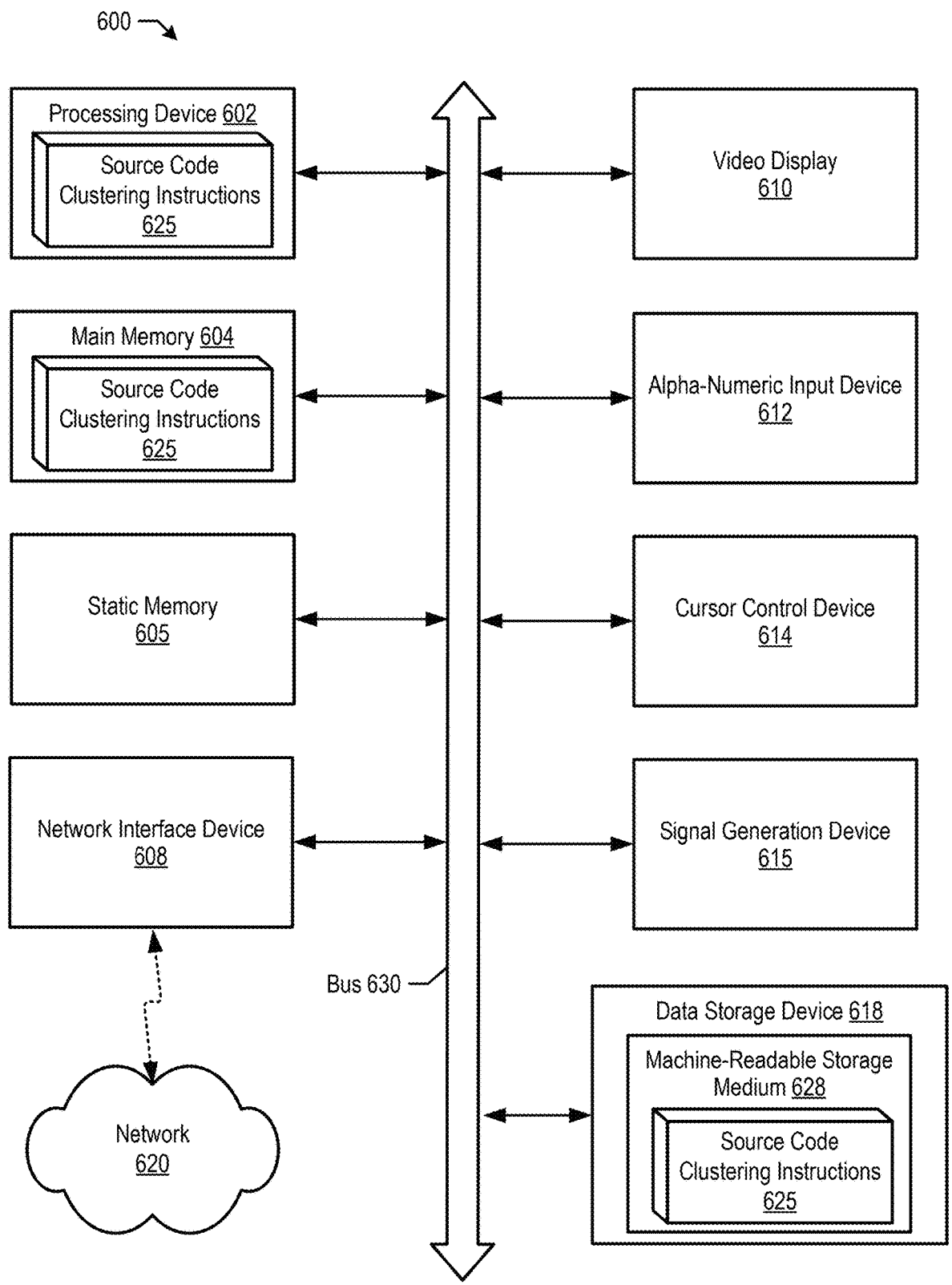
FIG. 6 illustrates a diagrammatic representation of a machine in the example form of a computer system within which a set of instructions, for causing the machine to perform any one or more of the methodologies discussed herein for processing a query.

FIG. 6 illustrates a diagrammatic representation of a machine in the example form of a computer system 600 within which a set of instructions, for causing the machine to perform any one or more of the methodologies discussed herein for intelligently scheduling containers.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute source code clustering instructions 625, for performing the operations and steps discussed herein.

The data storage device 618 may include a machine-readable storage medium 628, on which is stored one or more sets of source code clustering instructions 625 (e.g., software) embodying any one or more of the methodologies of functions described herein. The source code clustering instructions 625 may also reside, completely or at least partially, within the main memory 604 or within the processing device 602 during execution thereof by the computer system 600; the main memory 604 and the processing device 602 also constituting machine-readable storage media. The source code clustering instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "identifying," "generating," "inputting," "removing," "detecting," "determining," "evaluating," or the like, refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
providing a plurality of source code samples to an artificial intelligence model (AIM) trained to describe source code based on performing semantic analysis on the source code;
producing, by a processing device using the AIM, a plurality of semantic descriptions that describe the plurality of source code samples;
converting the plurality of semantic descriptions into a plurality of semantic embeddings; and
creating a plurality of clusters from the plurality of semantic embeddings, wherein each one of the plurality of clusters corresponds to two or more of the plurality of source code samples.

2. The method of claim 1, wherein each one of the plurality of semantic descriptions describe a functionality of a corresponding one of the plurality of source code samples.

3. The method of claim 1, further comprising:
providing the plurality of source code samples to a plurality of clustering paths, wherein the plurality of semantic descriptions, the plurality of semantic embeddings, and the plurality of clusters correspond to a first clustering path in the plurality of clustering paths;
producing, by each of the plurality of clustering paths, a plurality of different clusters based on a cluster type of their corresponding clustering path; and
re-ranking and merging the plurality of clusters with the plurality of different clusters to produce a plurality of final clusters.

4. The method of claim 3, wherein the plurality of clustering paths comprise a semantic clustering path, an agnostic clustering path, a label informed clustering path, and a task/label informed clustering path.

5. The method of claim 3, further comprising:
generating a plurality of cluster plots from the plurality of clusters and the plurality of different clusters;
identifying a discrepant cluster plot from the plurality of cluster plots that is misaligned from the remaining plurality of cluster plots;
identifying a first clustering path from the plurality of clustering paths that corresponds to the discrepant cluster plot; and
retraining the first clustering path.

6. The method of claim 3, wherein the plurality of final clusters comprise a first final cluster, the method further comprising:
identifying a group of source code samples from the plurality of source code samples that correspond to the first final cluster;
evaluating a subset of the group of source code samples to determine whether the group of source code samples indicate a cybersecurity threat; and
quarantining the group of source code samples in response to determining that the subset of source code samples indicate the cybersecurity threat.

7. The method of claim 1, further comprising:
training the AIM, wherein the training further comprises providing training source code, training source code descriptions, and one or more cybersecurity threat indicators to the AIM, wherein the one or more cybersecurity threat indicators identify one or more cybersecurity threats in the training source code.

8. A system comprising:
a processing device; and
a memory to store instructions that, when executed by the processing device, cause the processing device to:

provide a plurality of source code samples to an artificial intelligence model (AIM) trained to describe source code based on performing semantic analysis on the source code;

produce, using the AIM, a plurality of semantic descriptions that describe the plurality of source code samples;

convert the plurality of semantic descriptions into a plurality of semantic embeddings; and create a plurality of clusters from the plurality of semantic embeddings, wherein each one of the plurality of clusters corresponds to two or more of the plurality of source code samples.

9. The system of claim 8, wherein each one of the plurality of semantic descriptions describe a functionality of a corresponding one of the plurality of source code samples.

10. The system of claim 8, wherein, responsive to executing the instructions, further causes the system to:

provide the plurality of source code samples to a plurality of clustering paths, wherein the plurality of semantic descriptions, the plurality of semantic embeddings, and the plurality of clusters correspond to a first clustering path in the plurality of clustering paths;

produce, by each of the plurality of clustering paths, a plurality of different clusters based on a cluster type of their corresponding clustering path; and re-rank and merge the plurality of clusters with the plurality of different clusters to produce a plurality of final clusters.

11. The system of claim 10, wherein the plurality of clustering paths comprise a semantic clustering path, an agnostic clustering path, a label informed clustering path, and a task/label informed clustering path.

12. The system of claim 10, wherein, responsive to executing the instructions, further causes the system to:

generate a plurality of cluster plots from the plurality of clusters and the plurality of different clusters;

identify a discrepant cluster plot from the plurality of cluster plots that is misaligned from the remaining plurality of cluster plots;

identify a first clustering path from the plurality of clustering paths that corresponds to the discrepant cluster plot; and retrain the first clustering path.

13. The system of claim 10, wherein the plurality of final clusters comprise a first final cluster, and wherein, responsive to executing the instructions, further causes the system to:

identify a group of source code samples from the plurality of source code samples that correspond to the first final cluster;

evaluate a subset of the group of source code samples to determine whether the group of source code samples indicate a cybersecurity threat; and quarantine the group of source code samples in response to determining that the subset of source code samples indicate the cybersecurity threat.

14. The system of claim 8, wherein, responsive to executing the instructions, further causes the system to:

train the AIM by providing training source code, training source code descriptions, and one or more cybersecurity threat indicators to the AIM, wherein the one or more cybersecurity threat indicators identify one or more cybersecurity threats in the training source code.

15. A non-transitory computer readable medium, having instructions stored thereon which, when executed by a processing device, cause the processing device to:

provide a plurality of source code samples to an artificial intelligence model (AIM) trained to describe source code based on performing semantic analysis on the source code;

produce, using the AIM, a plurality of semantic descriptions that describe the plurality of source code samples;

convert the plurality of semantic descriptions into a plurality of semantic embeddings; and create a plurality of clusters from the plurality of semantic embeddings, wherein each one of the plurality of clusters corresponds to two or more of the plurality of source code samples.

16. The non-transitory computer readable medium of claim 15, wherein each one of the plurality of semantic descriptions describe a functionality of a corresponding one of the plurality of source code samples.

17. The non-transitory computer readable medium of claim 15, wherein the processing device is to:

provide the plurality of source code samples to a plurality of clustering paths, wherein the plurality of semantic descriptions, the plurality of semantic embeddings, and the plurality of clusters correspond to a first clustering path in the plurality of clustering paths;

produce, by each of the plurality of clustering paths, a plurality of different clusters based on a cluster type of their corresponding clustering path; and re-rank and merge the plurality of clusters with the plurality of different clusters to produce a plurality of final clusters.

18. The non-transitory computer readable medium of claim 17, wherein the plurality of clustering paths comprise a semantic clustering path, an agnostic clustering path, a label informed clustering path, and a task/label informed clustering path.

19. The non-transitory computer readable medium of claim 17, wherein the processing device is to:

generate a plurality of cluster plots from the plurality of clusters and the plurality of different clusters;

identify a discrepant cluster plot from the plurality of cluster plots that is misaligned from the remaining plurality of cluster plots;

identify a first clustering path from the plurality of clustering paths that corresponds to the discrepant cluster plot; and retrain the first clustering path.

20. The non-transitory computer readable medium of claim 17, wherein the plurality of final clusters comprise a first final cluster, and wherein the processing device is to:

identify a group of source code samples from the plurality of source code samples that correspond to the first final cluster;

evaluate a subset of the group of source code samples to determine whether the group of source code samples indicate a cybersecurity threat; and quarantine the group of source code samples in response to determining that the subset of source code samples indicate the cybersecurity threat.

* * * * *